US011237879B2

(12) United States Patent
van Riel et al.

(10) Patent No.: US 11,237,879 B2
(45) Date of Patent: *Feb. 1, 2022

(54) BATCHED STORAGE HINTING WITH FAST GUEST STORAGE ALLOCATION

(71) Applicant: Red Hat, Inc., Raleigh, NC (US)

(72) Inventors: Henri Han van Riel, Merrimack, NH (US); Michael Tsirkin, Lexington, MA (US)

(73) Assignee: Red Hat, Inc, Raleigh, NC (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/806,361

(22) Filed: Mar. 2, 2020

(65) Prior Publication Data

US 2020/0201685 A1 Jun. 25, 2020

Related U.S. Application Data

(63) Continuation of application No. 15/689,227, filed on Aug. 29, 2017, now Pat. No. 10,579,439.

(51) Int. Cl.
*G06F 9/50* (2006.01)
*G06F 12/1045* (2016.01)
*G06F 9/455* (2018.01)

(52) U.S. Cl.
CPC ........ *G06F 9/5077* (2013.01); *G06F 9/45558* (2013.01); *G06F 12/1063* (2013.01); *G06F 2009/45579* (2013.01); *G06F 2009/45583* (2013.01)

(58) Field of Classification Search
CPC ............... G06F 9/5077; G06F 9/45558; G06F 12/1063; G06F 2009/45583; G06F 2009/45579; G06F 9/5016
See application file for complete search history.

(56) References Cited

U.S. PATENT DOCUMENTS

| 6,598,143 B1 | 7/2003 | Baker et al. |
| 7,337,296 B2 | 2/2008 | Noel et al. |
| 7,433,951 B1 | 10/2008 | Waldspurger |

(Continued)

OTHER PUBLICATIONS

Riel, Rik van. "Re: [patch: 0/6] Guest page hinting". Posted Mar. 27, 2009. <https://lkml.org/lkml/2009/3/27/503> and <https :/ /lkml. org/lkml/2009/3/27 /503> in thread <https:/ /lkml.org/lkm 1/2009/ 3/27 /223>.

(Continued)

*Primary Examiner* — Francisco A Grullon
(74) *Attorney, Agent, or Firm* — Lowenstein Sandler LLP

(57) ABSTRACT

Systems and methods for batched storage hinting with fast guest storage allocation. An example method may involve: detecting, by a hypervisor, that storage has been released by a guest operating system and remains allocated to a virtual machine executing the guest operating system; accessing, by the hypervisor, one or more sets of storage blocks, wherein a set of the one or more sets comprises an identifier associated with the storage and is associated with the virtual machine; receiving, by a processing device executing the hypervisor, a request to allocate a storage block to the virtual machine; identifying, by the hypervisor, at least one storage block of the one or more sets that is associated with the virtual machine; and allocating the at least one storage block to the virtual machine.

20 Claims, 7 Drawing Sheets

(56) References Cited

U.S. PATENT DOCUMENTS

| | | | |
|---|---|---|---|
| 7,516,292 | B2 | 4/2009 | Kimura |
| 8,086,811 | B2 | 12/2011 | Gainey, Jr. |
| 8,255,658 | B2 | 8/2012 | Adachi |
| 8,583,875 | B1 | 11/2013 | Garthwaite et al. |
| 8,667,496 | B2 | 3/2014 | Levin |
| 8,689,007 | B2 | 4/2014 | Schunter et al. |
| 8,789,034 | B1 | 7/2014 | Emelyanov |
| 8,856,194 | B2 | 10/2014 | Chen |
| 8,875,295 | B2 | 10/2014 | Lutas |
| 8,943,259 | B2 | 1/2015 | Weissman |
| 9,069,782 | B2 | 6/2015 | Yang |
| 9,147,078 | B2 | 9/2015 | Muff |
| 9,183,157 | B2 | 11/2015 | Qiu |
| 9,201,682 | B2 | 12/2015 | Cheng |
| 9,251,090 | B1 | 2/2016 | Borthakur et al. |
| 9,268,678 | B2 | 2/2016 | Tuch et al. |
| 9,280,458 | B2 | 3/2016 | Durrant |
| 9,280,486 | B2 | 3/2016 | Riel |
| 9,298,377 | B2 | 3/2016 | Baskakov |
| 9,355,023 | B2 | 5/2016 | Badam et al. |
| 9,361,218 | B2 | 6/2016 | Ahmad et al. |
| 9,390,028 | B2 | 7/2016 | Gordon |
| 9,442,754 | B1 | 9/2016 | Tsirkin |
| 9,448,928 | B2 | 9/2016 | Ahad |
| 9,459,900 | B2 | 10/2016 | Tsirkin |
| 9,471,346 | B2 | 10/2016 | Gaonkar et al. |
| 9,507,540 | B1 | 11/2016 | Adogla |
| 9,509,501 | B2 | 11/2016 | Bursell |
| 9,524,233 | B2 | 12/2016 | Venkatasubramanian |
| 9,529,611 | B2 | 12/2016 | McDougall et al. |
| 9,552,233 | B1 | 1/2017 | Tsirkin |
| 9,619,263 | B2 | 4/2017 | Broas |
| 9,672,062 | B1 | 6/2017 | Tsirkin et al. |
| 9,798,482 | B1 | 10/2017 | Tsirkin et al. |
| 9,940,228 | B2 | 4/2018 | Corrie |
| 10,083,058 | B2 | 9/2018 | Tsirkin |
| 10,579,439 | B2* | 3/2020 | van Riel ............ G06F 9/45558 |
| 2007/0016904 | A1 | 1/2007 | Adlung |
| 2008/0307188 | A1 | 12/2008 | Franaszek et al. |
| 2009/0307447 | A1 | 12/2009 | Jacobs et al. |
| 2010/0070678 | A1 | 3/2010 | Zhang |
| 2010/0095074 | A1 | 4/2010 | Ganesh et al. |
| 2010/0169536 | A1 | 7/2010 | Shedel et al. |
| 2010/0325268 | A1 | 12/2010 | Muthiah |
| 2011/0154133 | A1* | 6/2011 | Ganti ................ G06F 11/0793 714/54 |
| 2011/0246767 | A1 | 10/2011 | Chaturvedi et al. |
| 2011/0320682 | A1 | 12/2011 | McDougall et al. |
| 2012/0079479 | A1 | 3/2012 | Hakewill |
| 2012/0239850 | A1 | 9/2012 | Qiu |
| 2012/0317331 | A1 | 12/2012 | Broas |
| 2012/0331242 | A1* | 12/2012 | Shaikh ............... G06F 9/45533 711/154 |
| 2013/0145073 | A1 | 6/2013 | Tuch et al. |
| 2013/0290596 | A1 | 10/2013 | Corrie |
| 2013/0339568 | A1 | 12/2013 | Corrie |
| 2014/0173227 | A1* | 6/2014 | Min ..................... G06F 3/0644 711/159 |
| 2015/0039838 | A1 | 2/2015 | Tarasuk-Levin |
| 2015/0089010 | A1 | 3/2015 | Tsirkin |
| 2015/0199209 | A1 | 7/2015 | Tsirkin |
| 2015/0242159 | A1 | 8/2015 | Tsirkin |
| 2015/0301946 | A1 | 10/2015 | Guo |
| 2016/0077965 | A1 | 3/2016 | Gaonkar |
| 2016/0078585 | A1 | 3/2016 | Sheldon |
| 2016/0085695 | A1 | 3/2016 | Leslie-Hurd et al. |
| 2016/0253201 | A1 | 9/2016 | Zhang |
| 2016/0350236 | A1 | 12/2016 | Tsirkin |
| 2016/0350244 | A1 | 12/2016 | Tsirkin |
| 2017/0108914 | A1 | 4/2017 | Chun et al. |
| 2017/0206175 | A1 | 7/2017 | Sliwa et al. |
| 2018/0095899 | A1 | 4/2018 | Durham et al. |
| 2018/0285140 | A1* | 10/2018 | Kaplan ............... G06F 9/45558 |
| 2019/0065267 | A1 | 2/2019 | van Riel et al. |
| 2019/0065276 | A1 | 2/2019 | van Riel et al. |

OTHER PUBLICATIONS

Corbet. "Guest page hinting". Posted Sep. 6, 2006. <http://lwn.net/Articles/198380/>. Comment posted by rvdheij on Sep. 14, 2006.

Waldspurger, C.A., "Memory Resource Management in VMware ESX Server," Proceedings of the 5th Symposium on Operating Systems Design and Implementation,Boston, Massachusetts, Dec. 9-11, 2002, 15 pages.

Scwidefsky, M. et al., "Collaborative Memory Management in Hosted Linux Environments," (IBM), Linux Symposium, Ottawa, Canada, Jul. 19-22, 2006, 16 pages.

Van Riel, R., "KVM Performance Optimizations Internals," The Red Hat Summit, Boston, Massachusetts, May 5, 2011, 25 pages.

Corbet, J., "Linux Filesystem, Storage, and Memory Management Summit, Day 2," 2011 Linux Filesystem, Storage and Memory Management Summit, San Francisco, California, Apr. 5, 2011, 9 pages.

"The Role of Memory in VMware ESX Server 3—Information Guide," VMware, Inc. Sep. 26, 2006, 11 pages.

Schwidefsky, M., "Linux Kernel Archive: [patch 0/6] [rfc] guest page hinting version 5" (May 11, 2007), downloaded on Jul. 28, 2011 from http://llkml.indiana.edu/hypermail/linux/kernel/0705.1/21 01 html, 2 pages.

Schwidefsky, M., "Linux Kernel Archive: [patch 1/6] Guest page hinting: core+ volatile page cache," (Jun. 28, 2007), downloaded on Jul. 28, 2011 from http://comments.gmane.org/gmane.comp.emulators. kvm .devel/4314, 1 page.

Schwidefsky, M., "Linux Kernel Archive: [patch 2/6] Guest page hinting," (May 11, 2007), downloaded on Jul. 28, 2011 from http://llkml.indiana.edu/hypermail/linux/kernel/0705.1/2100html, 8 pages.

Schwidefsky, M., "Linux Kernel Archive: [patch 3/6] Guest page hinting: mlocked pages," (May 11, 2007), downloaded on Jul. 28, 2011 from http://llkml.indiana.edu/hypermail/linux/kernel/0705.1/21 02html, 3 pages.

Schwidefsky, M., "Linux Kernel Archive: [patch 4/6] Guest page hinting: writable page table entries," (May 11, 2007), downloaded on Jul. 28, 2011 from http:/lkml.indiana.edu/hypermail/linux/kernel/0705.1/21 04html, 7 pages.

Schwidefsky, M., "Linux Kernel Archive: [patch 5/6] Guest page hinting: minor fault optimization," (May 11, 2007), downloaded on Jul. 28, 2011 from http://llkml.indiana.edu/hypermail/linux/kernel/0705.1/21 03html, 5 pages.

Schwidefsky, M., "Linux Kernel Archive: [patch 6/6] Guest page hinting: s390 support," (May 11, 2007), downloaded on Jul. 28, 2011 from http://lkml.indiana.edu/hypermail/linux/kernel/0705.1 /21 05html, 14 pages.

Schwidefsky, M., "Guest page hinting: cover page." Published Sep. 6, 2006. <http://lwn.net/Articles/198384/>.

"Kernel Zeroes Memory?" Stack Overflow, 3 pages, downloaded from http://stackoverflow.com/questions/6004816/kernel-zeroes-memory on Sep. 1, 2016.

Hosterman, C. "Pure Storage FlashArray and Re-Examining VMware Virtual Disk Types," Cody Hosterman, FlashArray, VAAI, VMware, XCopy, Jul. 23, 2014, 9 pages, downloaded from http://www.codyhosterman.com/2014/07/pure-storage-flasharray-and-re-examining-vmware-virtual-disk-types/ on Sep. 1, 2016.

Chiang et al. "Working Set-based Physical Memory Ballooning," 10th International Conference on Autonomic Computing (ICAC '13), USENIX Association, pp. 95-99.

"Performance Best Practices for VMware vSphere® 5.5" VMware, Inc., Sep. 19, 2013, 90 pages.

Improving host swapping using adaptive prefetching and paging notifier; Chen, Wenzhi et al; Proceedings of the 19th ACM International Symposium on High Performance Distributed Computing; Jun. 21-25, 2010; pp. 300-303 (4 pages).

Denneman, Frank, "Impact of Memory Reservation", Dec. 8, 2009, http://frankdenneman.nl/2009/12/08/impact-of-memory-reservation,18 pages.

"Bug 995420—Qemu-Kvm Process do not Release Memory(RES) after Guest Do Stress Test", 2013, https://bugzilla.redhat.com/show_bug.cgi?id=995420/.

(56) References Cited

OTHER PUBLICATIONS

Riel, Rik van, "Guest Memory Overcommit—Page Hinting, Resizing & More", Red Hat, 2011, http://www.linux-kvm.org/images/f/ff/2011-forum-memory-overcommit.pdf, 14 pages.

"8.2. Memory Tuning on Virtual Machines", https://access.redhat.com/documentation/en-US/Red_Hat_Enterprise_Linux/7/html/Virtualization_Tuning_and_Optimization_Guide/sect-Virtualization_Tuning_Optimization_Guide-Memory-Tuning.html, 6 pages.

Agarwal, Neha & Wenisch, Thomas F., "Thermostat: Application-transparent Page Management for Two-tiered Main Memory", Apr. 12, 2017, University of Michigan, http://web.eecs.umich.edu/~twenisch/papers/asplos17.pdf, 14 pages.

Huang, Jian, Qureshi, Moinuddin K., Schwan, Karsten, "An Evolutionary Study of Linux Memory Management for Fun and Profit", Jun. 24, 2016, Georgia Institute of Technology, https://www.usenix.org/system/files/conference/atc16/atc16_paper-huang.pdf, 15 pages.

Bigelow, S. "How Hypervisors Dynamically Allocate Memory to Improve VM Performance", Search Server Virtualization, Jun. 2013, 10 pages.

Yang, J. et al., "Using Hypervisor to Provide Data Secrecy for User Applications on a Per-Page Basis", University of Michigan, Mar. 5, 2008, 10 pages.

Hetzelt, F. et al., "Security Analysis of Encrypted Virtual Machines", Cornell University Library, Dec. 4, 2016, 3 pages.

Eklektix, Inc., "Guest Page Hinting", https://lwn.net/Articles/198380/, Sep. 6, 2006, 2 pages.

Vmware, Inc., "Understanding Memory Resource Management in Vmware® ESX™ Server", https://www.vmware.com/content/dam/digitalmarketing/vmware/en/pdf/techpaper/perf-vsphere-memory_management.pdf, 2009, 20 pages.

Chen, W. et al. "Improving host swapping using adaptive prefetching and paging notifier"; Proceedings of the 19th ACM International Symposium on High Performance Distributed Computing; Jun. 21-25, 2010; pp. 300-303 (4 pages).

* cited by examiner

BATCHED STORAGE HINTING WITH FAST GUEST STORAGE ALLOCATION

RELATED APPLICATIONS

The present application is a continuation of application Ser. No. 15/689,227, filed Aug. 29, 2017, entitled "BATCHED STORAGE HINTING WITH FAST GUEST STORAGE ALLOCATION," which is incorporated by reference herein.

TECHNICAL FIELD

The present disclosure is generally related to virtualized computer systems, and more particularly, to storage allocation in virtualized computer systems.

BACKGROUND

Virtualization allows multiplexing of an underlying host machine between different virtual machines. The host machine allocates a certain amount of its storage resources to each of the virtual machines. Each virtual machine is then able to use the allocated storage resources to execute applications, including operating systems (referred to as guest operating systems). Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that the virtual machine has a contiguous address space, while in fact the memory used by the virtual machine may be physically fragmented and even overflow to disk storage. When the host machine frees memory, the host machine may select memory pages that have been assigned to virtual machines and page out the contents of the selected memory pages to disk storage. When the virtual machines attempt to access the memory pages, the host machine may page in the contents of the memory page by retrieving the contents from disk storage and writing the content back to memory. Reallocating memory between virtual machines may involve a large amount of input/output (I/O) and processing power, which may adversely affect performance of a host machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
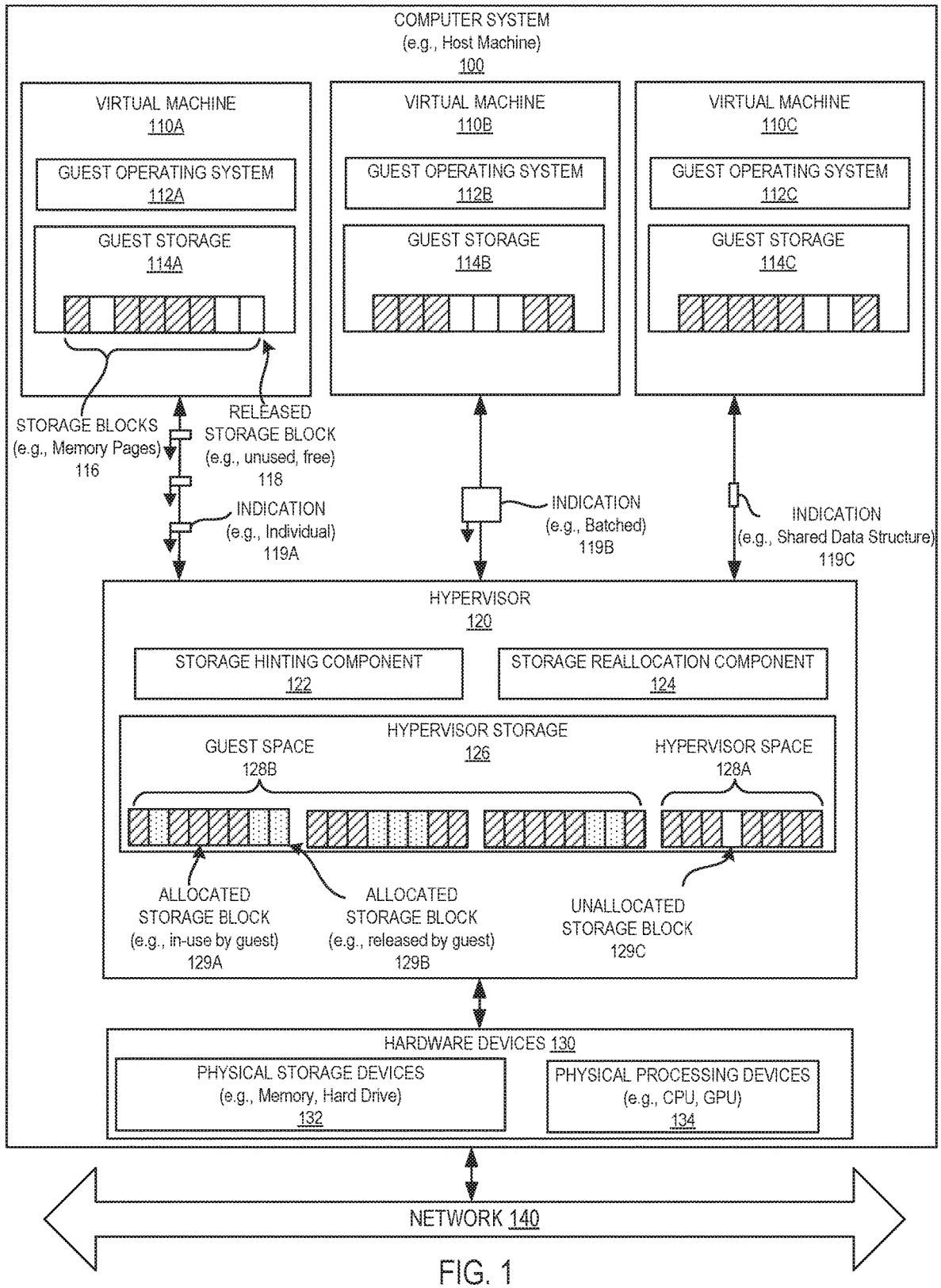
FIG. 1 depicts a high-level block diagram of an example computer system architecture, in accordance with one or more aspects of the present disclosure.

Many modern virtualized computer systems include overlapping storage management features that manage the same underlying physical storage resources. For example, a hypervisor and a guest operating system may both include storage management functionality that implements a caching mechanism across different storage devices. The caching mechanism may involve memory pages that are paged to or from a persistent storage. The hypervisor and guest operating systems may function separately and a hypervisor may allocate storage to a virtual machine but may be unaware of which portions of storage are in use by a guest operating system executing on the virtual machine. Knowledge of the guest operating system's use of the storage may be useful to a hypervisor managing memory because portions of storage that have been released by the guest operating system may be reused without the overhead of copying the data to and from persistent storage (e.g., page swapping).

Many hypervisors handle allocating storage to virtual machines and wipe the storage prior to providing the virtual access to the storage. The wiping may involve zeroing out the content of the storage and may be a time consuming task. Wiping the storage prior to allocation may enhance security because the storage may have been used by another virtual machine and may include confidential information from the other virtual machine. Wiping the storage portion may minimize the risk that the content within the storage is "leaked" to another virtual machine. While such wiping enhances security, there is processing overhead associated with wiping that may adversely affect performance.

Aspects of the present disclosure address the above and other deficiencies by providing technology that enables a hypervisor to more efficiently detect when storage resources allocated to a virtual machine are not in use by the guest operating system and to more efficiently reallocate the storage resources by reducing the frequency of storage wiping. In one example, a hypervisor may receive an indication that a plurality of storage blocks (e.g., memory pages) have been released by a guest operating system running on a virtual machine. The indication may be a message that was initiated by the guest operating system to indicate which of the storage blocks are not in use. The indication may identify a single storage block that was released or may be a batched indication that identifies multiple released storage blocks. The hypervisor may add identifiers of the released storage blocks to a set. The set may include storage block identifiers from multiple different virtual machines and each identifier may indicate its corresponding virtual machine. The hypervisor may receive a request to allocate a new storage block to one of the virtual machines and may analyze the set to identify which of the storage blocks were previously associated with the requesting virtual machine. If the set does not include a storage block associated with the requesting virtual machine, the hypervisor may select a storage block released from another virtual machine. The storage block released from another machine may be cleared and allocated to the requesting virtual machine. If the set includes a storage block that was previously associated with the requesting virtual machine, the hypervisor may allocate the storage block to the requesting virtual machine without clearing it.

In one example, the storage blocks may be memory pages and the virtual machines may include a virtual device whose memory usage shrinks over time. The virtual device may be referred to by the descriptive term "balloon" virtual device and may relinquish memory that is no longer being used to the hypervisor. The hypervisor may then re-allocate released memory to other virtual machines or for use by the hypervisor, host operating system, underlying hardware device, or a combination thereof.

The systems and methods described herein include technology that enhances the memory management of virtualized computer systems. In particular, aspects of the present disclosure provide technology that enables a hypervisor to detect storage blocks (e.g., memory pages) that have been allocated to a virtual machine but are not in use by the virtual machine (e.g., released by guest operating system). Detecting the allocated but unused storage blocks is advantageous because they may be reallocated without the overhead of writing the content of the storage block to a backing store (e.g., swap space) or retrieving the content from the backing store when access to the storage block is reattempted. Aspects of the present disclosure also enable the hypervisor to fulfill a storage request of a virtual machine using storage blocks that were previously used by the virtual machine. This may be advantageous because it may enable the hypervisor to reduce data leaks between virtual machines without the overhead of clearing the content of every allocated storage block. In another aspect of the present disclosure, the hypervisor may detect storage blocks that have been released (e.g., no longer in use) in a more efficient manner by using batched indications. The batched indications may identify multiple released storage blocks and therefore reduce the overhead of receiving separate indications for each released storage block.

Various aspects of the above referenced methods and systems are described in details herein below by way of examples, rather than by way of limitation. The examples provided below discuss a virtualized computer system with a hypervisor without a corresponding host operating system, but other examples may include a hypervisor with an underlying host operating system.

FIG. 1 depicts an illustrative architecture of computer system 100, in accordance with an example of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include one or more virtual machines 110A-C, a hypervisor 120, hardware devices 130, and a network 140.

Virtual machines 110A-C may execute guest executable code that uses an underlying emulation of physical resources. The guest executable code may include one or more guest operating systems 112A-C that manage guest applications, guest device drivers, other executable code, or a combination thereof. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. The guest operating systems 112A-C may manage guest storage 114A-C Guest storage 114A-C may be any virtual data storage, logical data storage, physical data storage, other storage, or a combination thereof for storing, organizing, or accessing data. Guest storage 114A-C may each include a portion of physical storage devices 132 that has been designated for use by the respective virtual machine. Guest storage 114A-C may function as volatile data storage or non-volatile data storage as discussed in below in regards to physical storage devices 132. Guest storage 114A-C may store data within one or more storage blocks 116.

Storage blocks 116 may include a contiguous or non-contiguous sequence of bytes or bits and may have a size that is the same or different from a physical block size of the underlying physical storage devices 132. The size of the storage blocks 116 may be a fixed-size, such as a particular integer value (e.g., 4 KB, 2 MB) or may be a variable-size that varies within a range of integer values. Each of the storage blocks 116 may have a block size that is the same or different from the block size of an adjacent block. In one example, storage blocks 116 may be memory blocks of a volatile or non-volatile memory device and may each correspond to an individual memory page, multiple memory pages, or a portion of a memory page. A portion of the memory blocks may have a standard size (e.g., page size of 4 KB) and another portion of the memory blocks may have an enlarged size (e.g., page size of 2 MB), which may be referred to as "huge pages." In another example, each of the storage blocks 116 may correspond to a portion (e.g., sector, block, partition, record, file) of a mass storage device (e.g., hard disk, solid state drive (SSD)), other data storage device, or a combination thereof.

Hypervisor 120 may also be known as a virtual machine monitor (VMM) and may provide virtual machines 110A-C with access to one or more features of hardware device. Hypervisor 120 may manage system resources, including access to hardware devices 130. In the example shown, hypervisor 120 may run directly on the hardware of computer system 100 (e.g., bare metal hypervisor). In another example, hypervisor 120 may run on or within a host operating system (not shown). Hypervisor 120 may include hypervisor storage 126, which may include multiple storage blocks that are separated into a hypervisor space 128A and a guest space 128B. Hypervisor space 128A may be allocated for use by hypervisor 120 and guest space 128B may be allocated to virtual machines 110A-C and may correspond to guest storages 114A-C. Each of the storage blocks within hypervisor storage 126 may be either allocated (e.g., 129A and 129B) or unallocated (e.g., 129C). An allocated storage block may be allocated by hypervisor 120 for use by one of the guest operating systems 112A-C and may be allocated and in-use by the guest as illustrated by 129A or allocated and not in use as illustrated by 129B. As shown in FIG. 1, hypervisor 120 may include a storage hinting component 122 and a storage reallocation component 124.

Storage hinting component 122 may processes storage hints received from the virtual machines in the form of indications 119A-C. The storage hints may indicate which of the storage blocks associated with a virtual machine are in use or not in use by the virtual machine. For example, a hypervisor may allocate a portion of hypervisor storage 126 for use by a virtual machine and the guest operating system 112A may manage the storage (e.g., guest storage 114A). Guest operating system 112A may be configured to optimize the use of the storage by allocating portions of the storage to processes managed by guest operating system 112A and to use the remaining portion as file system cache. As guest operating system 112A executes, it may release one or more storage blocks (e.g., released storage block 118) and may transmit indication 119A to hypervisor 120 to indicate the one or more storage blocks were released.

Storage reallocation component 124 may interact with storage hinting component 122 to identify portions of hypervisor storage 126 that can be used to fulfill requests for storage blocks. Storage reallocation component 124 may analyze data of storage hinting component 122 to distinguish between allocated storage block 129A that is in use by guest operating system 112A from allocated storage block 129B that is allocated to virtual machine 110A but is not in use by guest operating system 112A. It may be advantageous to reallocate the latter storage block because it corresponds to released storage block 118.

Released storage block 118 may be any storage block 116 that is released by the guest operating system or other portion of a virtual machine. Releasing a storage block may involve a guest operating system instructing a virtual machine to execute a release operation that is the same or similar to freeing, deallocating, dereferencing, deleting, removing, other operation, or a combination thereof. In one example, a release operation may be initiated by the guest operating system in response to being notified that a storage block is no longer in use. This may occur when a process managed by the guest operating system makes a system call to the guest operating system to free the storage block. In another example, a release operation may be initiated by the guest operating system in response to determining the storage is no longer in use by a process or thread managed by the guest operating system (e.g., garbage collection). In either example, releasing a storage block may result in the storage block being available for reuse by the guest operating system while remaining allocated to the virtual machine. The guest operating system or virtual machine may indicate to the hypervisor that the storage block is not in use (e.g., released) by using indications 119A-C.

Indications 119A-C may include one or more signals for indicating to hypervisor 120 that one or more storage blocks have been released. The signal may be a message, interrupt, notification, exception, trap, other signal, or a combination thereof. Indications 119A-C may be transmitted from a virtual machine to the hypervisor or from the hypervisor to the virtual machine and may occur before, during, or after a storage block is released. The technology disclosed herein may implement one or more of indication 119A, indication 119B, indication 119C, other indication mechanism, or a combination thereof.

Indication 119A may be a message transmitted from virtual machine 110A to hypervisor 120 that includes identification data (e.g., identifier) for a released storage block 118 or a range of released storage blocks. Indication 119A may be one of a series of indications and each indication in the series may identify an individual storage block or an individual range of storage blocks. Indication 119A may be transmitted in response to a particular storage block being released and may indicate to the hypervisor that the particular storage block has been released. In one example, each indication 119A may correspond to a system call, hypercall, other function call, or a combination thereof that is initiated by the guest operating system.

Indication 119B may a batched message that is similar to indication 119A and may include one or more storage blocks or storage block ranges that have been released. Batching the storage blocks into indication 119B (e.g., batched message) may be advantageous because it may reduce the communications overhead (e.g., I/O) that occurs between the virtual machines and hypervisor 120. Indication 119B may be transmitted from virtual machine 110A to hypervisor 120 in response to a quantity of released storage blocks satisfying (e.g., at, above, or below) one or more threshold quantities. The threshold quantities may be based on a size of the storage (e.g., total storage, allocated storage, unallocated storage) and may be a particular quantity of storage blocks (e.g., page count) or a quantity of space occupied by the storage blocks (e.g., buffer space limit). The threshold quantities may include one or more values that may include integers, percentages, ratios, other values, or a combination thereof. The values may be relative to the size or limit of a storage block, guest storage 114A-C, hypervisor storage 126, physical storage devices 132, heap, page, buffer, other data structure, or a combination thereof.

Indication 119C may include one or more signals that identify a shared data structure that represents the status of guest storage blocks and indicates to hypervisor 120 which guest storage blocks are released, un-released, or a combination thereof. Indication 119C may include a first signal that may be sent prior to a storage block being released and one or more second signals may be sent after one or more storage blocks are released. The first signal may be in the form of a message that is transmitted during an initialization of guest operating system 112C or initialization of a particular storage management module of guest operating system 112C. The first signal may include information (e.g., reference, pointer) identifying the shared data structure that represents guest storage 114C or represents multiple guest storages 114A-C. When the one or more of the storage blocks are released, the respective virtual machine may update the shared data structure to indicate to hypervisor 120 that the storage block was released. Hypervisor 120 may subsequently access the shared data structure after storage blocks are released. In one example, hypervisor 120 may listen for second signals (e.g., modification events) that indicate the shared data structure was updated. In another example, hypervisor 120 may not listen for second signals and may access the shared data structure when hypervisor 120 determines storage blocks should be reallocated (e.g., storage faults exceed a threshold or available storage blocks fall below a threshold).

The shared data structure may be modified by one or more of the virtual machines and may be accessible to the hypervisor. The shared data structure may be an array (e.g., bitmap), a linked list, other data structure, or a combination thereof. The shared data structure may include an element (e.g., bit, node) for each of the storage blocks and the element may indicate whether the storage block is released, un-released, or other state. In one example, the shared data structure may be stored in storage space of the virtual machine (e.g., guest space 128B). For example, each virtual machine may include a shared data structure in its respective guest storage 114A-C, which may be accessible to hypervisor 120. In another example, the shared data structure may be stored in hypervisor storage 126 and be accessible to one or more of the virtual machines. In the latter example, there may be a separate shared data structure within hypervisor storage 126 that corresponds to each of the virtual machine 110A-C or there may be a single shared data structure accessible that corresponds to the group of virtual machines 110A-C.

Hardware devices 130 may provide hardware functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks discussed above in regards to components 122 and 124. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). Physical processing device 134 may also be referred to as a central processing unit (CPU).

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
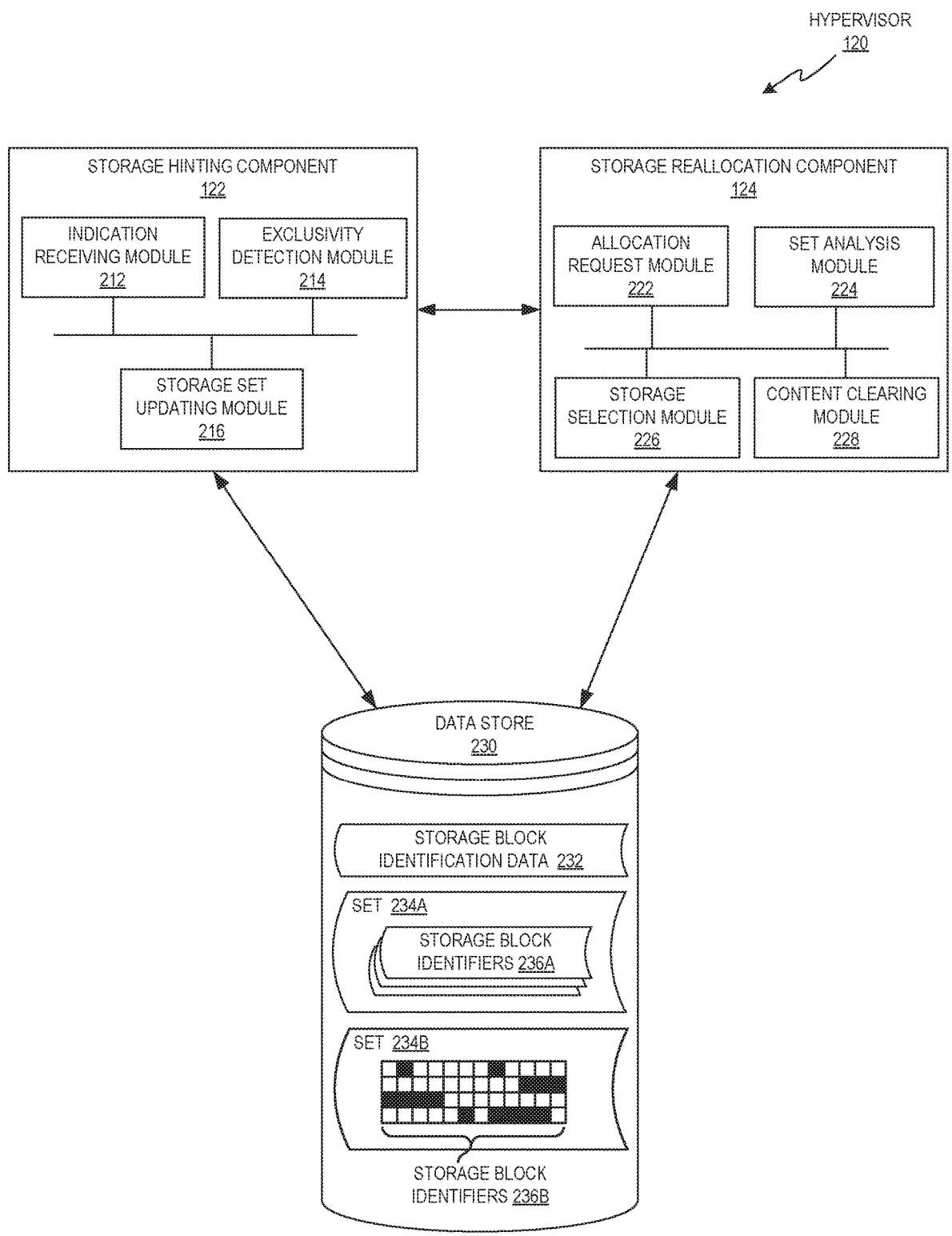
FIG. 2 depicts a block diagram of an example hypervisor that implements batched storage hinting with fast guest storage allocation in accordance with one or more aspects of the present disclosure.

FIG. 2 is a block diagram illustrating example components and modules of hypervisor 120, in accordance with one or more aspects of the present disclosure. Hypervisor 120 may be the same or similar to the hypervisor 120 of FIG. 1 and may include a storage hinting component 122 and a storage reallocation component 124. More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

Storage hinting component 122 may processes storage hints received from virtual machines in the form of one or more indications. Storage hinting component 122 may process the indications to identify a set of storage blocks that have been assigned to a virtual machine but are not being used by the virtual machine. In the example shown in FIG. 1, storage hinting component 122 may include an indication receiving module 212, an exclusivity detection module 214, and a storage set updating module 216.

Indication receiving module 212 may be a portion of hypervisor that receives indications from the virtual machine. The indications may include storage block identification data 232 for identifying one or more storage blocks or ranges of storage blocks. Storage block identification data 232 may include an offset value (numeric or non-numeric value), an address (virtual, logical, or physical address), a pointer, a link, other data, or a combination thereof. In one example, the identification data may be a storage block identifier that uniquely identifies a released storage block or may be data (e.g., offset value) that may be used by hypervisor 120 to determine the storage block identifier of a released storage block. In another example, the identification data may include a reference to a data structure that indicates the one or more storage blocks that are released (e.g., not in use), non-released (e.g., in use), or a combination thereof. The data structure may be an array (e.g., bitmap), a linked list, other data structure, or a combination thereof.

Exclusivity detection module 214 may analyze the released storage blocks that the virtual machine indicated were released and determine whether the storage blocks are in use by any other computing entity. The other computing entity may be another virtual machine, the hypervisor, a host operating system, a hardware device, any executable code (e.g., process, thread, or computing stream), or a combination thereof. A particular storage block may be assigned to one or more computing entities. When a storage block is assigned to multiple computing entities the computing entities share the storage block and neither has exclusive use of the storage block. Therefore, when one of the computing entities releases the storage block the hypervisor may not reuse the storage block because it may still be in use by another computing entity. In contrast, if the storage block is assigned to a single computing entity and is in not in use by another computing entity it is referred to as being exclusively used by the single computing entity. Therefore, when the single computing entity (e.g., virtual machine) releases the storage block it may be reallocated by the hypervisor for use by another computing entity.

Exclusivity detection module 214 may analyze the released storage block to verify that the released storage block is exclusively assigned to a single computing entity (e.g., a single virtual machine). Verifying that a storage block is exclusively assigned to a computing entity may involve determining whether any other computing entity is using (e.g., modifying, accessing, or has been assigned) the storage block. For example, verifying that a storage block is exclusively assigned to the virtual machine may involve determining whether another virtual machine has access to or has been assigned the same storage block. In one example, the storage blocks may be memory pages and exclusivity detection module 214 may analyze a storage data structure that identifies which memory pages are assigned to which computing entities to determine whether a particular storage block is being shared between computing entities or is being exclusively used by a single computing entity.

Storage set updating module 216 may update a set of storage blocks based on data of indication receiving module 212 and exclusivity detection module 214. The set may be update to reflect the storage blocks that are allocated to a virtual machine but remain unused by the virtual machine. Updating the set may involve adding storage blocks to the set or removing storage blocks from the set depending on whether the storage blocks are available to be reallocated by the hypervisor. In one example, storage set updating module 216 may add a storage block to the set of storage blocks in response to receiving an indication that the storage block has been released and determining the released storage block is exclusively accessed by a single computing entity. In another example, storage set updating module 216 may add a released storage block to the set of storage blocks in response determining that the storage block is shared by multiple computing entities and was released by each of the respective computing entities. The set of storage blocks may be represented by a data structure such as set 234A or set 234B.

Sets 234A and 234B may both include one or more storage block identifiers and computing entity identification data. The storage block identifiers may include storage block identification data that is used to identify one or more storage blocks or ranges of storage blocks. The computing entity identification data may be used to identify the computing entity that is associated with or was previously associated with the storage block (e.g., previous owner or assignee). The computing entity identification data may be useful because it may indicate the source of the content within the storage block and may be subsequently used to determine whether the content of a reallocated storage block should be cleared. Computing entity identification data may identify a particular virtual machine, guest operating system, process, thread, other computing stream, or a combination thereof. In one example, the computing entity identification data may be a unique identifier (e.g., virtual machine identifier). In another example, the computing entity identification data may be a pointer (e.g., memory address) to the virtual machine or a memory structure that describes the virtual machine. Although sets 234A and 234B both include storage block and computing entity identification data, they may store and represent the data differently.

Set 234A is an example set that includes one or more storage block identifiers 236A and each of the storage block identifiers 236A may include an offset value (numeric or non-numeric value), an address (virtual, logical, or physical address), a pointer, a link, other data, or a combination thereof. Storage block identifier 236A may uniquely identify a storage block that is in a released state (e.g., allocated and not in use), a non-released state (e.g., allocated and in use), unassigned (e.g., unallocated), other state, or a combination thereof. In one example, set 234A may only include the storage blocks that have been released and ignore storage blocks that are in use or that are unallocated. In another example, set 234A may include storage blocks that have been released and storage blocks that are in use or that are unallocated and they may be marked accordingly.

Set 234B is another example set that includes one or more storage block identifiers 236B that represent corresponding storage blocks. Each of the storage block identifiers 236B may be a flag (e.g., bit) that represents one or more states of a corresponding storage block. The states may include a released state (e.g., allocated and not in use), a non-released state (e.g., allocated and in use), unassigned (e.g., unallocated, deallocated), assigned (e.g., allocated), other state, or a combination thereof. In one example, set 234B may be a bitmap and each storage block identifier 236B may correspond to a binary flag (e.g., bit) that indicates whether the corresponding storage block is available for reuse (e.g., released and exclusively assigned) or unavailable for reuse (e.g., unreleased or not exclusively assigned). In other example, set 234B may be an n-dimensional array, linked list, other data structure, or a combination thereof.

Storage reallocation component 124 may interact with storage hinting component 122 to identify portions of the hypervisor's storage that can be allocated (e.g., reallocated) to fulfill requests from computing entities for additional storage blocks. Storage reallocation component 124 may analyze data of storage hinting component 122 to identify storage blocks that have been allocated to a computing entity but are not in use by the computing entity. For example, a storage block may be allocated to a virtual machine but may have been released by the guest operating system of the virtual machine and may remain in an allocated but unused state (e.g., released). Traditionally, reallocating a storage block may involve copying content of the storage block to a backing store and clearing the storage block before reallocating it to fulfill the request for a storage block. The technology disclosed herein may enable hypervisor 120 to reallocate storage blocks in a more efficient manner because storage reallocation component 124 may be able to detect when a storage block that is allocated to a virtual machine is not in use by the virtual machine. As a result, storage reallocation component 124 may reallocate (e.g., reuse) the storage block without copying the content of the storage block to a backing store and subsequently retrieving the content from the backing store when the original virtual machine attempts to access the storage block again. In the example shown in FIG. 2, storage reallocation component 124 may include an allocation request module 222, a set analysis module 224, a storage selection module 226, and a content clearing module 228.

Allocation request module 222 may receive or access a request from a virtual machine to allocate storage to the virtual machine. The virtual machine may initiate the request using a variety of different mechanism. A first mechanism may involve a failed attempt to access a storage block that no longer resides at the designated location in the physical storage device. This may occur when the storage block is a memory page and the memory page has been evicted. The attempt to access the memory page may generate a page fault, which may be addressed by an underlying memory management module. The page fault may function as the request to allocate storage. A second mechanism may involve a virtual machine initiating the request using a hypercall. The virtual machine may be executing in a para-virtualized environment and be aware of and able to communicate with the hypervisor using hypercalls. A hypercall may be similar to a system call but may enable a thread executed by the virtual machine to communicate with the hypervisor as opposed to the guest operating system. In one example, the hypercall may be used to implement storage ballooning.

Storage ballooning may be a storage reclamation technique that is used by a hypervisor or host operating system to enable a computer system to take memory from one or more virtual machines and share it with other virtual machines. Storage ballooning may enable the total amount of storage resources (e.g., memory pages) occupied by the guest virtual machines to exceed the amount of physical storage resources (e.g., main memory) available on the computer system. When the computer system is low on physical storage resources the storage ballooning may allocate the storage resources selectively among the virtual machines. The storage balloon represents the storage provided to other virtual machines and the process of a virtual machine relinquishing storage may be referred to as inflating the balloon and the process of acquiring storage may be referred to as deflating the balloon. Portions of storage ballooning may be implemented within each of the virtual machines in the form of a driver (e.g., balloon driver) or storage function (e.g., kernel storage management module) of the guest operating system. Storage ballooning may enable multiple virtual machine to share storage resources amongst one another in a voluntary or involuntary manner. In one example, storage ballooning may be the same or similar to a computer memory reclamation technique known as virtual memory ballooning. Virtual memory ballooning may be used by hypervisor 120 to enable the computer system (e.g., host machine) to retrieve unused memory from certain guest virtual machines.

The act of relinquishing storage may be different then the act of releasing storage, which is discussed above. Releasing storage may involve a guest operating system freeing the storage so that it is unused by the guest operating system even though the storage remains allocated to the virtual memory executing the guest operating system. A guest operating system that releases storage may not change the amount of storage allocated to the virtual machine and may just change the use of the storage allocated to the virtual machine. Therefore, a guest operating system that releases storage may enable the total amount of storage allocated to the virtual machine to remain constant (e.g., approximately the same). Relinquishing storage may involve the guest operating system identifying a portion of storage that can be given back to the hypervisor so that the total amount of storage allocated to the virtual machine changes (e.g., does not remain constant) and either decreases (e.g., balloon inflates) or increases (balloon deflates).

Set analysis module 224 may enable hypervisor 120 to analyze the set of storage blocks (e.g., set 234A or 234B) to identify one or more storage blocks that can be reallocated to satisfy the request for additional storage. Set analysis module 224 may gather data about multiple different aspects of each storage block, such as, the source of the storage block (e.g., associated virtual machine, original owner), the size of the storage block (e.g., standard page or huge page), the location of the storage block (e.g., proximity to other released storage blocks), other information, or a combination thereof.

Storage selection module 226 may access data gathered by set analysis module 224 and may select one or more storage blocks that fulfill the request and enhance the performance of the computer system. The selection of a storage block may take into account the amount of storage blocks that should be cleared, the locality of the storage blocks (e.g., whether they are partially or completely contiguous), the size alignment (e.g., a single huge page better then multiple standard pages), other aspects, or a combination thereof. Minimizing the amount of storage that should be cleared may involve determining which virtual machine requested a storage block and comparing the requesting virtual machine to virtual machines associated with the released storage blocks. In one example, storage selection module 226 may prioritize the released storage blocks that match the requesting virtual machine over released storage blocks that do not match the requesting virtual machine. In another example, storage selection module may weigh multiple different aspects (including clearing) and select the storage block with the best (e.g., highest or lowest) weight.

Content clearing module 228 may access a set of selected storage blocks and selectively clear one or more of the selected blocks. Content clearing module 228 may avoid clearing a selected storage block when the virtual machine that is associated with the storage block matches the virtual machine requesting a storage block. When the virtual machines do not match, content clearing module 228 may clear the content of the storage block. Clearing the content may involve overwriting, replacing, resetting, wiping, or zeroing out the data within the storage block. The clearing may occur before, during, or after the storage block is allocated to the requesting virtual machine but before the virtual machine can access the content of the storage block.

Figure 3:
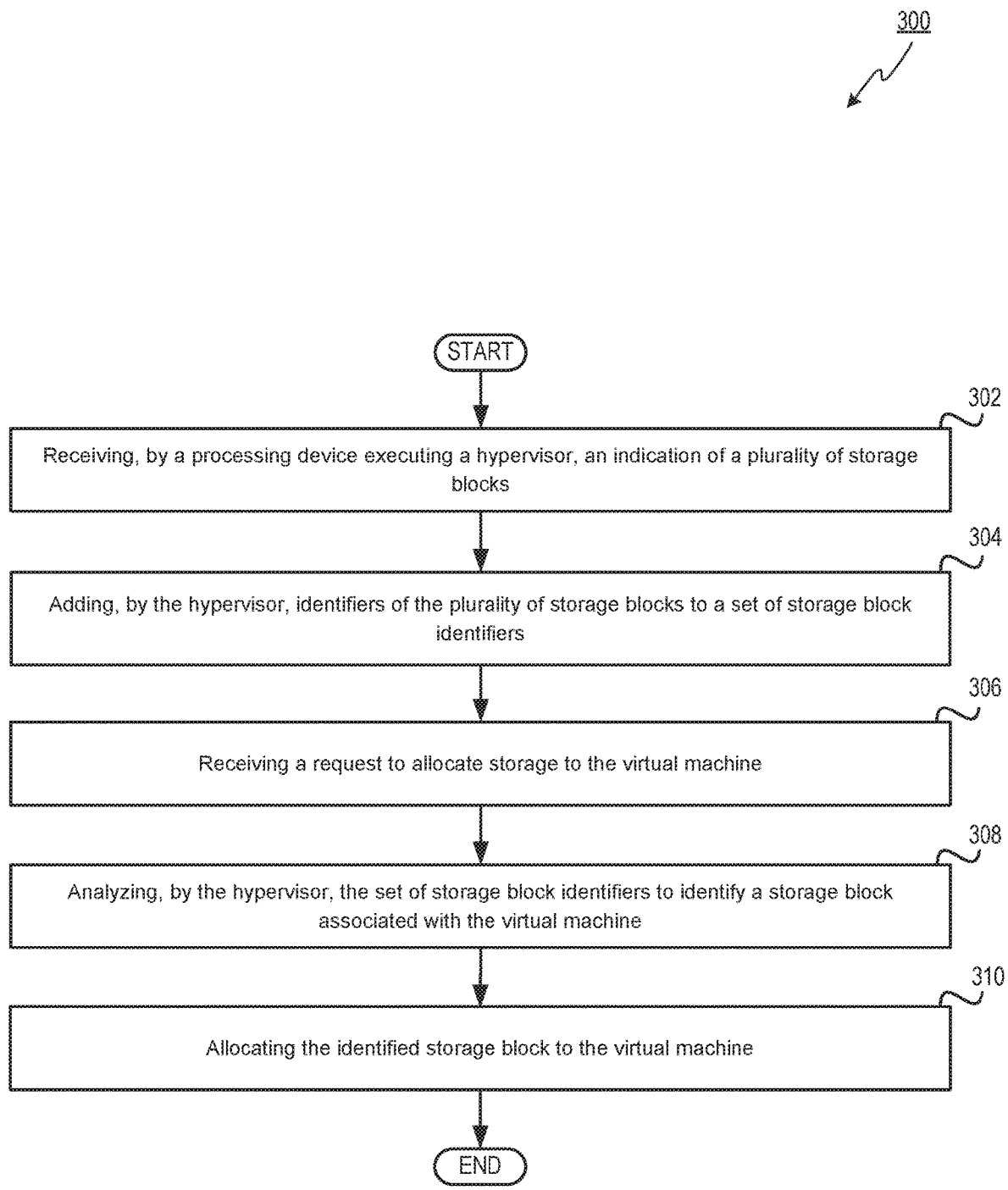
FIG. 3 depicts a flow diagram of an example method for a hypervisor to implement batched storage hinting with fast guest storage allocation, in accordance with one or more aspects of the present disclosure.
Figure 4:
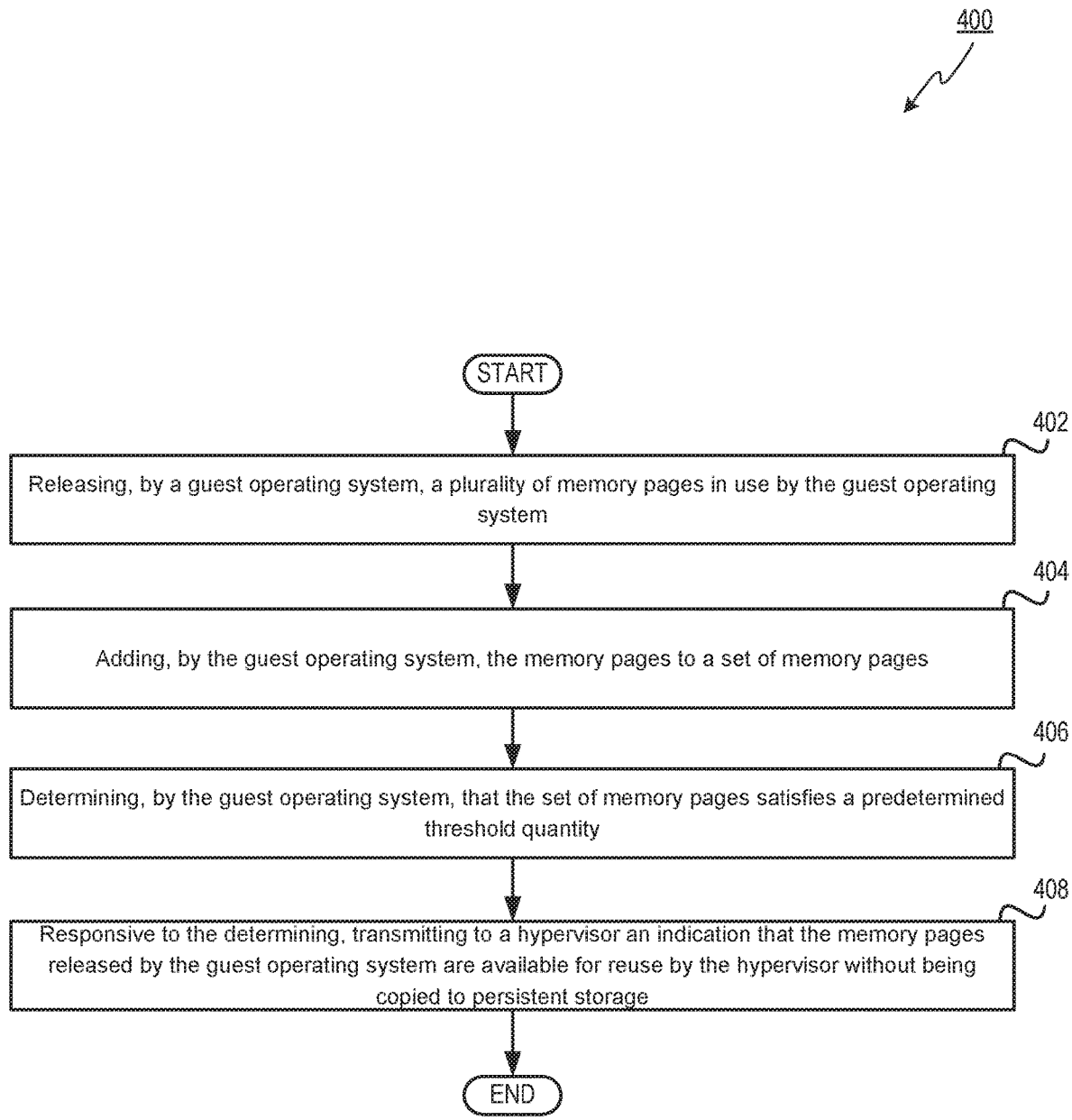
FIG. 4 depicts a flow diagram of an example method for a virtual machine to implement batched storage hinting with fast guest storage allocation, in accordance with one or more aspects of the present disclosure.

FIGS. 3 and 4 depict flow diagrams for illustrative examples of methods 300 and 400 for batched storage hinting with fast guest storage allocation, in accordance with one or more aspects of the present disclosure. Method 300 illustrates an example process flow from the perspective of the hypervisor and method 400 is an example process flow from the perspective of a virtual machine. Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computer system 100 as shown in FIG. 1.

Method 300 may be performed by processing devices of a server device or a client device and may begin at block 302. At block 302, the processing device executing a hypervisor may receive an indication of a plurality of storage blocks released by a guest operating system running on a virtual machine. Each of the storage blocks may include a contiguous portion of virtual, logical, or physical data storage. In one example, the plurality of storage blocks may be memory pages that are released by the guest operating system but may remain assigned or associated with the virtual machine prior to being reallocated by the hypervisor. The indications received by the hypervisor may be received using different mechanisms. In one example, the indication of the plurality of storage blocks released by a guest operating system may involve a single hypercall indicating that a quantity of the storage blocks released by the guest operating system exceeds a predetermined threshold. In another example, the indication of the plurality of storage blocks released by a guest operating system may include a reference to a bitmap. The bitmap may represent a set of storage blocks assigned to the guest operating system and may indicate a subset of the storage blocks that have been released by the guest operating system. The bitmap may be modifiable by one or more guest operating systems and accessible to the hypervisor.

At block 304, the processing device executing the hypervisor may add identifiers of the plurality of storage blocks to a set of storage block identifiers. The identifiers in the set may be associated with the virtual machine that they are allocated to. In one example, the set of storage block identifiers may correspond to storage blocks released by guest operating systems of a plurality of virtual machines and each identifier of the set may be linked to a respective virtual machine of the plurality of virtual machines. Before, during, or after adding the identifier to the set the processing device may verify the storage block. The verification may be done to determine whether the storage blocks released by the guest operating system are exclusively assigned to the virtual machine executing the guest operating system. In one example, verifying the storage block is exclusively assigned to the virtual machine may involve determining the storage block is accessible by the virtual machine and is inaccessible by another virtual machine. In another example, verifying the storage block is exclusively assigned to the guest operating system may involve determining the storage block is associated with the virtual machine and is not in use by the hypervisor, another virtual machine, the host machine, or a hardware device (e.g., direct memory access (DMA)).

At block 306, the processing device executing the hypervisor may receive a request to allocate a storage block to the virtual machine. The virtual machine may initiate the request using a variety of different mechanism. A first mechanism may involve a page fault in response to attempting to access a storage block that no longer resides at the designated location in the physical storage device. This may occur when the storage block is a memory page and the memory page has been evicted. The page fault may be addressed by an underlying memory management module and may function as the request to allocate storage for the virtual machine. A second mechanism may involve a virtual machine initiating the request using a hypercall. In one example, the hypercall may originate from a balloon driver installed on the guest operating system.

At block 308, the processing device executing the hypervisor may analyze the set of storage block identifiers to identify a storage block associated with the virtual machine. The processing device may analyze multiple different aspects of each storage block, such as, the source of the storage block (e.g., associated virtual machine, original owner), the size of the storage block (e.g., standard page or huge page), the location of the storage block (e.g., proximity to other released storage blocks), other information, or a combination thereof. The processing device may then identify (e.g., select) one or more storage blocks that fulfill the request. The identification of a storage block may take into account whether the storage block(s) should be cleared, the locality of the storage blocks (e.g., whether they are partially or completely continuous), or the size alignment (e.g., a single huge page better then multiple standard pages). Minimizing the amount of storage that should be cleared may involve determining which virtual machine requested a storage block and comparing the requesting virtual machine to virtual machines associated with the released storage blocks. In one example, storage selection module 226 may prioritize the released storage blocks that match the requesting virtual machine over released storage blocks that do not match the requesting virtual machine. In another example, storage selection module may weigh multiple different aspects (including clearing) and select the storage block with the best (e.g., highest or lowest) weight.

At block 310, the processing device may allocate the identified storage block to the virtual machine. Allocating the storage block to the virtual machine that requested it may involve updating one or more storage data structures that manage the storage to indicate that the storage block has been allocated to the virtual machine. In response to the allocation, the set of released storage blocks may be updated to remove the storage block that was just allocated. Allocating the storage block may be equivalent to the hypervisor reusing the storage block. In some situations, the hypervisor may allocate the storage block of a first virtual machine to a second virtual machine. When the storage block is a memory page, this may involve the hypervisor reusing the memory page identified by the set without copying content of the memory page to persistent storage (e.g., swap space on a hard drive). When the first virtual machine (e.g., original virtual machine) attempts to re-access the storage block the hypervisor may allocate another memory page but may do so without retrieving the content of the memory page from swap space. This may be advantageous because although the memory page was previously allocated to the first virtual machine it was not in use and therefore its contents were extraneous and there may be no need for the hypervisor to store or retrieve the extraneous content from a backing store. Responsive to completing the operations described herein above with references to block 310, the method may terminate.

In other examples of method 300, the processing device executing the hypervisor may selectively clear storage blocks before, during, or after the storage block reallocation. For example, the hypervisor may receive a request to allocate a storage block to a second virtual machine and may analyze the set of storage block identifiers to identify a storage block associated with the second virtual machine. In response to the set being free of a storage block associated with the second virtual machine, the hypervisor may clear a storage block released by a first virtual machine and allocate the cleared storage block to the second virtual machine. However, in response to the set including a storage block associated with the second virtual machine, the hypervisor may allocate the storage block associated with the second virtual machine to the second virtual machine without clearing the storage block.

Referring to FIG. 4, method 400 may be performed by a virtual machine being managed by the hypervisor discussed above and may begin at block 402. At block 402, a processing device executing a guest operating system may release a plurality of storage blocks (e.g., memory pages) in use by the guest operating system. The guest operating system may be executing on a virtual machine comprising a plurality of virtual processors that are provided (e.g., emulated) by the hypervisor. The plurality of memory pages may be contiguous or non-contiguous blocks of virtual memory (e.g., a 4K or 2M byte block of memory). The memory pages may be designated by a hypervisor for use for a particular guest operating system or for a particular virtual processor of the guest operating system. In one example, the set of memory pages may include a plurality of non-contiguous memory pages of only one of the plurality of virtual processors.

At block 404, the processing device executing the guest operating system may add the released memory pages to a set of memory pages. The set of memory pages may be stored in a data structure that is accessible to the guest operating system that is or is not accessible to the hypervisor. The set of memory pages may be updated each time a memory page is released to add an identifier corresponding to the released memory page. An identifier of a memory page may include any data for identifying the memory page and may include information about the memory page such as a pointer, location, size, offset, or other information for identifying logical or physical locations of a portion of memory. After a memory page is released and added to the set of memory pages, it may be reused by the guest operating system without being removed from the set of memory page. This may occur because the page allocator of the guest operating system may continue to function after a particular memory page is added to the set. As a result, the page allocator may provide (e.g., allocate) the particular memory page for reuse without the memory page being removed from the set. The existence of memory pages that are in use (e.g., no longer released) may be addressed during a memory verification process discussed below.

At block 406, the processing device executing the guest operating system may determine that the set of memory pages satisfies a predetermined threshold quantity. In one example, the determination of whether the threshold has been satisfied may involve analyzing the set of memory pages in view of one or more predetermined threshold quantities. One or more of the threshold quantities may be based on the size of the set and may be a particular quantity of pages (e.g., page count) or may be based on the quantity of space occupied by the pages (e.g., buffer space limit). In one example, the threshold quantity may indicate a minimum size that the set may reach before being batched together into a notification destined for the hypervisor.

Responsive to determining the threshold has been satisfied, the processing device may acquire a lock that prevents a page allocator of the guest operating system from allocating memory pages before notifying the hypervisor. The page allocator may be for a particular virtual processor or portion of guest memory or may be for all virtual processors and guest memory associated with the guest operating system. Acquiring the lock may involve updating a lock indicator that includes a counter. The counter may correspond to a processor counter or a global counter, wherein the process counter corresponds to a particular virtual processor of the virtual machine and the global counter corresponds to multiple virtual processors of the virtual machine. In one example, acquiring the lock may involve incrementing the counter a first time to an even number and releasing the lock may involve incrementing the counter a second time to an odd number. After acquiring the lock, the processing device may verify that the set of the memory pages remain unused after being released. During the verification of the set of memory pages, the processing device may remove any memory pages that are now in use.

At block 408, the processing device executing the guest operating system may indicate to the hypervisor that the memory pages released by the guest operating system are available for reuse by the hypervisor without being copied to persistent storage. The indication may involve forming a message comprising memory page identifiers corresponding to the set of memory pages and transmitting the message to the hypervisor using a hypercall. The persistent storage may include a swap space and the particular memory pages released by the guest operating system may be reused by the hypervisor without copying the particular memory page to the swap space. In one example, the processing device may access the particular memory pages after being reused by the hypervisor without the hypervisor copying the memory page from the swap space. Responsive to completing the operations described herein above with references to block 408, the method may terminate.

Figure 5:
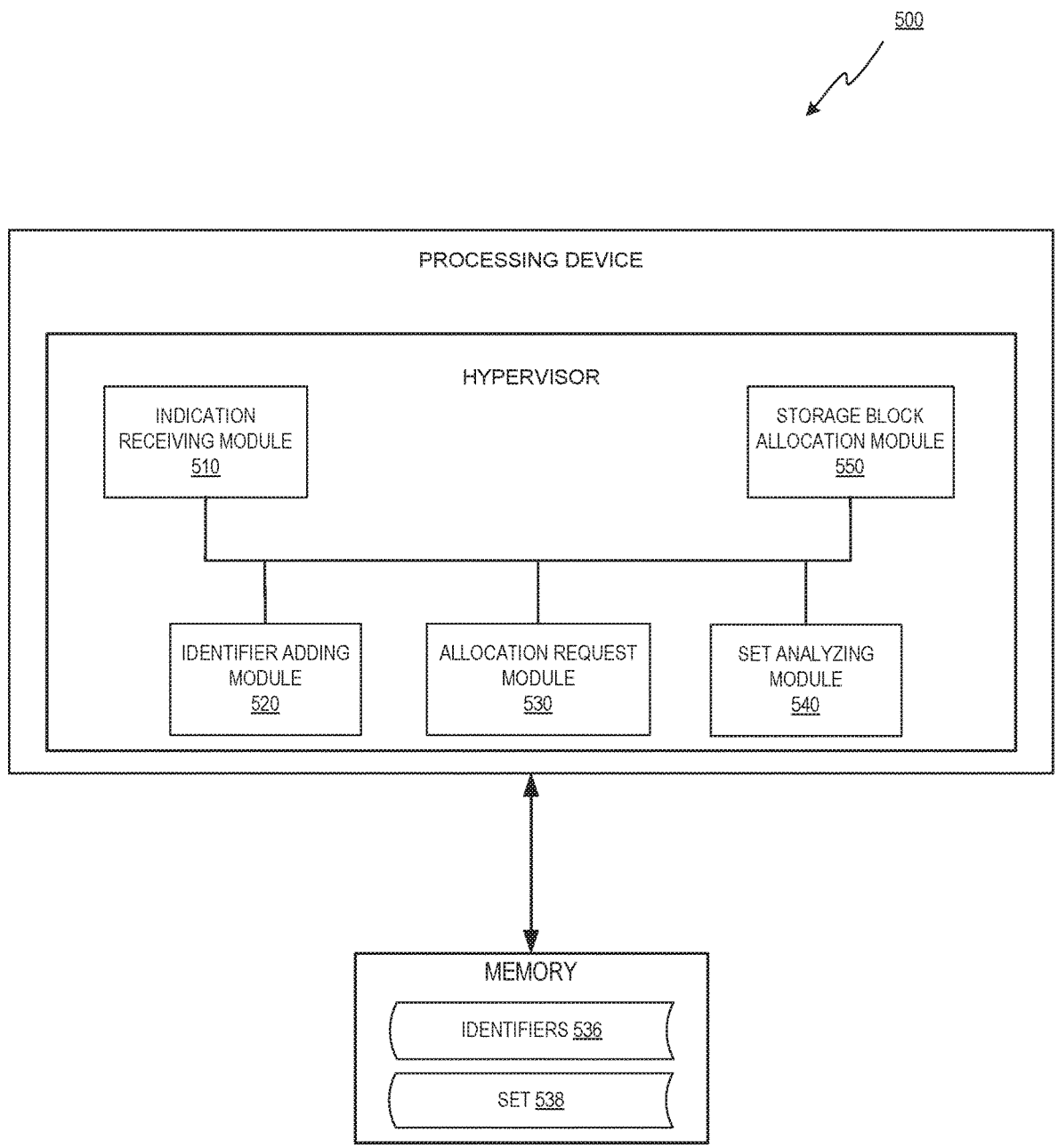
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 100 and may include one or more processing devices and one or more memory devices. In the example shown, computer system 500 may include an indication receiving module 510, an identifier adding module 520, an allocation request module 530, a set analyzing module 540, and a storage block allocation module 550.

Indication receiving module 510 may enable the processing device to receive an indication of a plurality of storage blocks released by a guest operating system running on a virtual machine. Each of the storage blocks may include a contiguous portion of virtual, logical, or physical data storage. In one example, the plurality of storage blocks may be memory pages that are released by the guest operating system but may remain assigned or associated with the virtual machine prior to being reallocated by the hypervisor. The indications received by the hypervisor may be received using different mechanisms. In one example, the indication of the plurality of storage blocks released by a guest operating system may involve a single hypercall indicating that a quantity of the storage blocks released by the guest operating system exceeds a predetermined threshold. In another example, the indication of the plurality of storage blocks released by a guest operating system may include a reference to a bitmap. The bitmap may represent a set of storage blocks assigned to the guest operating system and may indicate a subset of the storage blocks that have been released by the guest operating system. The bitmap may be modifiable by one or more guest operating systems and accessible to the hypervisor.

Identifier adding module 520 may instruct the processing device to add identifiers 536 of the plurality of storage blocks to a set 538 of storage block identifiers. Identifiers 536 in the set 538 may be associated with the virtual machine that they are allocated to. In one example, set 538 may correspond to storage blocks released by guest operating systems of a plurality of virtual machines and each identifier 536 of the set 538 may be linked to a respective virtual machine of the plurality of virtual machines. Before, during, or after adding identifiers 536 to set 538 the processing device may verify the storage block. The verification may be done to determine whether the storage blocks released by the guest operating system are exclusively assigned to the virtual machine executing the guest operating system. In one example, verifying the storage block is exclusively assigned to the virtual machine may involve determining the storage block is accessible by the virtual machine and is inaccessible by another virtual machine. In another example, verifying the storage block is exclusively assigned to the guest operating system may involve determining the storage block is associated with the virtual machine and is not in use by the hypervisor, another virtual machine, the host machine, or a hardware device (e.g., direct memory access (DMA)).

Allocation request module 530 may enable the processing device to receive a request to allocate a storage block to the virtual machine. The virtual machine may initiate the request using a variety of different mechanism. A first mechanism may involve a page fault in response to attempting to access a storage block that no longer resides at the designated location in the physical storage device. This may occur when the storage block is a memory page and the memory page has been evicted. The page fault may be addressed by an underlying memory management module and may function as the request to allocate storage for the virtual machine. A second mechanism may involve a virtual machine initiating the request using a hypercall. In one example, the hypercall may originate from a balloon driver installed on the guest operating system.

Set analyzing module 540 may instruct the processing device to analyze set 538 of storage block identifiers to identify a storage block associated with the virtual machine. The processing device may analyze multiple different aspects of each storage block, such as, the source of the storage block (e.g., associated virtual machine, original owner), the size of the storage block (e.g., standard page or huge page), the location of the storage block (e.g., proximity to other released storage blocks), other information, or a combination thereof. The processing device may then identify (e.g., select) one or more storage blocks that fulfill the request. The identification of a storage block may take into account whether the storage block(s) should be cleared, the locality of the storage blocks (e.g., whether they are partially or completely continuous), or the size alignment (e.g., a single huge page better then multiple standard pages). Minimizing the amount of storage that should be cleared may involve determining which virtual machine requested a storage block and comparing the requesting virtual machine to virtual machines associated with the released storage blocks.

Storage block allocation module 550 may instruct the processing device to allocate the identified storage block to the virtual machine. Allocating the storage block to the virtual machine that requested it may involve updating one or more storage data structures that manage the storage to indicate that the storage block has been allocated to the virtual machine. In response to the allocation, the set of released storage blocks may be updated to remove the storage block that was just allocated. Allocating the storage block may be equivalent to the hypervisor reusing the storage block. In some situations, the hypervisor may allocate the storage block of a first virtual machine to a second virtual machine. When the storage block is a memory page, this may involve the hypervisor reusing the memory page identified by the set without copying content of the memory page to persistent storage (e.g., swap space on a hard drive). When the first virtual machine (e.g., original virtual machine) attempts to re-access the storage block the hypervisor may allocate another memory page but may do so without retrieving the content of the memory page from swap space.

Figure 6:
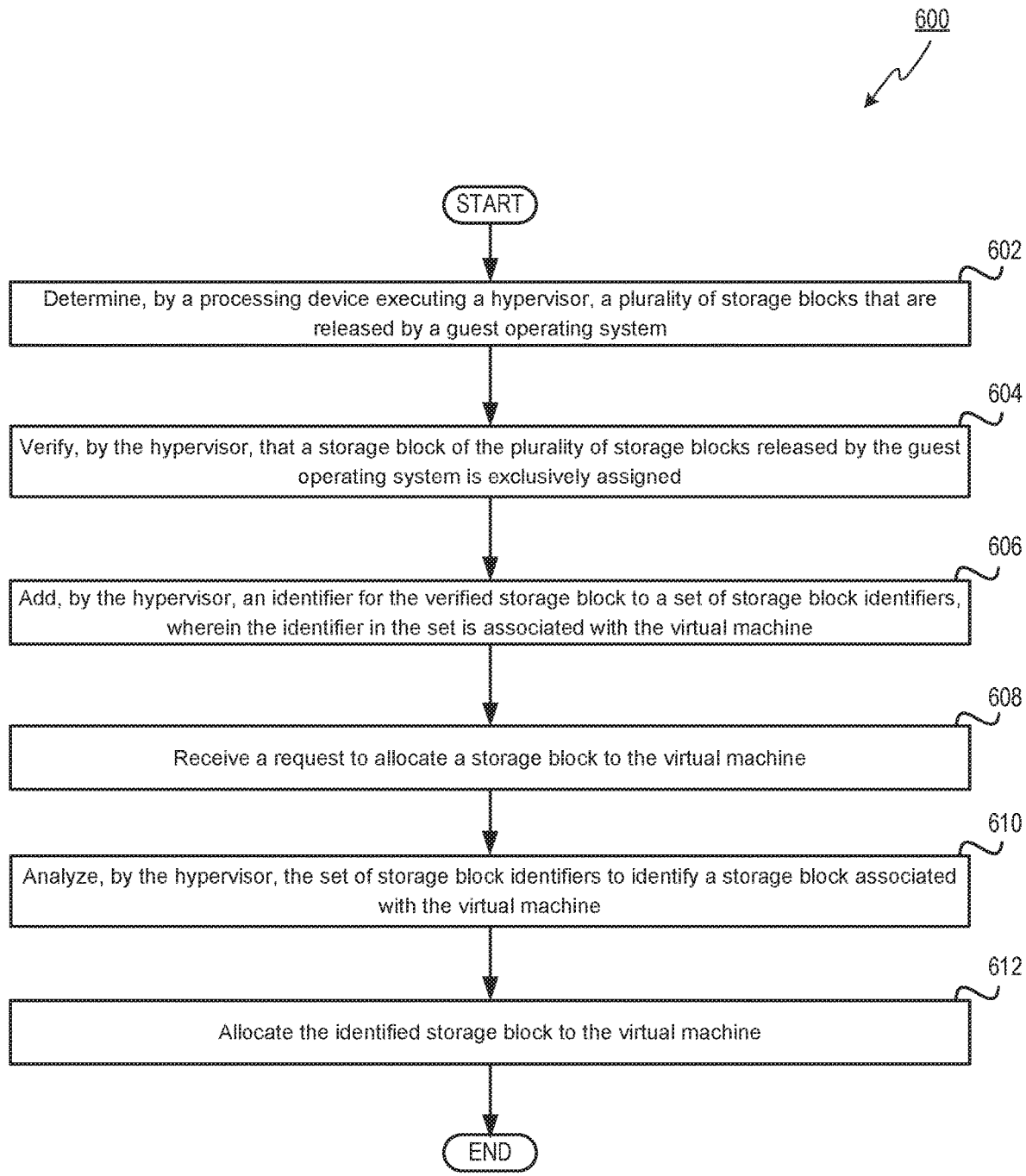
FIG. 6 depicts a flow diagram of another example method for a hypervisor to implement batched storage hinting with fast guest storage allocation, in accordance with one or more aspects of the present disclosure.

FIG. 6 depicts a flow diagram of one illustrative example of a method 600 for batched free memory page hinting, in accordance with one or more aspects of the present disclosure. Method 600 may be similar to method 300 and may be performed in the same or a similar manner as described above in regards to method 300. Method 600 may be performed by processing devices of a server device or a client device and may begin at block 602.

At block 602, the processing device executing a hypervisor may determine that a plurality of storage blocks are released by a guest operating system running on a virtual machine. Each of the storage blocks may include a contiguous portion of virtual, logical, or physical data storage. In one example, the plurality of storage blocks may be memory pages that are released by the guest operating system but may remain assigned or associated with the virtual machine prior to being reallocated by the hypervisor. The indications received by the hypervisor may be received using different mechanisms. In one example, the indication of the plurality of storage blocks released by a guest operating system may involve a single hypercall indicating that a quantity of the storage blocks released by the guest operating system exceeds a predetermined threshold. In another example, the indication of the plurality of storage blocks released by a guest operating system may include a reference to a bitmap. The bitmap may represent a set of storage blocks assigned to the guest operating system and may indicate a subset of the storage blocks that have been released by the guest operating system. The bitmap may be modifiable by one or more guest operating systems and accessible to the hypervisor.

At block 604, the processing device executing the hypervisor may verify that a storage block of the plurality of storage blocks released by the guest operating system is exclusively assigned to the virtual machine. The verification may occur before, during, or after adding the identifier to the set. In one example, verifying the storage block is exclusively assigned to the virtual machine may involve determining the storage block is accessible by the virtual machine and is inaccessible by another virtual machine. In another example, verifying the storage block is exclusively assigned to the guest operating system may involve determining the storage block is associated with the virtual machine and is not in use by the hypervisor, another virtual machine, the host machine, or a hardware device (e.g., direct memory access (DMA)).

At block 606, the processing device executing the hypervisor may add an identifier for the verified storage block to a set of storage block identifiers. The identifier in the set may be associated with the virtual machine that it is allocated or assigned to. In one example, the set of storage block identifiers may correspond to storage blocks released by guest operating systems of a plurality of virtual machines and each identifier of the set may be linked to a respective virtual machine of the plurality of virtual machines.

At block 608, the processing device executing the hypervisor may receive a request to allocate a storage block to the virtual machine. The virtual machine may initiate the request using a variety of different mechanism. A first mechanism may involve a page fault in response to attempting to access a storage block that no longer resides at the designated location in the physical storage device. This may occur when the storage block is a memory page and the memory page has been evicted. The page fault may be addressed by an underlying memory management module and may function as the request to allocate storage for the virtual machine. A second mechanism may involve a virtual machine initiating the request using a hypercall. In one example, the hypercall may originate from a balloon driver installed on the guest operating system.

At block 610, the processing device executing the hypervisor may analyze the set of storage block identifiers to identify a storage block associated with the virtual machine. The processing device may analyze multiple different aspects of each storage block, such as, the source of the storage block (e.g., associated virtual machine, original owner), the size of the storage block (e.g., standard page or huge page), the location of the storage block (e.g., proximity to other released storage blocks), other information, or a combination thereof. The processing device may then identify (e.g., select) one or more storage blocks that fulfill the request. The identification of a storage block may take into account whether the storage block(s) should be cleared, the locality of the storage blocks (e.g., whether they are partially or completely continuous), or the size alignment (e.g., a single huge page better then multiple standard pages). Minimizing the amount of storage that should be cleared may involve determining which virtual machine requested a storage block and comparing the requesting virtual machine to virtual machines associated with the released storage blocks. In one example, storage selection module 226 may prioritize the released storage blocks that match the requesting virtual machine over released storage blocks that do not match the requesting virtual machine. In another example, storage selection module may weigh multiple different aspects (including clearing) and select the storage block with the best (e.g., highest or lowest) weight.

At block 612, the processing device may allocate the identified storage block to the virtual machine. Allocating the storage block to the virtual machine that requested it may involve updating one or more storage data structures that manage the storage to indicate that the storage block has been allocated to the virtual machine. In response to the allocation, the set of released storage blocks may be updated to remove the storage block that was just allocated. Allocating the storage block may be equivalent to the hypervisor reusing the storage block. In some situations, the hypervisor may allocate the storage block of a first virtual machine to a second virtual machine. When the storage block is a memory page, this may involve the hypervisor reusing the memory page identified by the set without copying content of the memory page to persistent storage (e.g., swap space on a hard drive). When the first virtual machine (e.g., original virtual machine) attempts to re-access the storage block the hypervisor may allocate another memory page but may do so without retrieving the content of the memory page from swap space. This may be advantageous because although the memory page was previously allocated to the first virtual machine it was not in use and therefore its contents were extraneous and there may be no need for the hypervisor to store or retrieve the extraneous content from a backing store. Responsive to completing the operations described herein above with references to block 612, the method may terminate.

Figure 7:
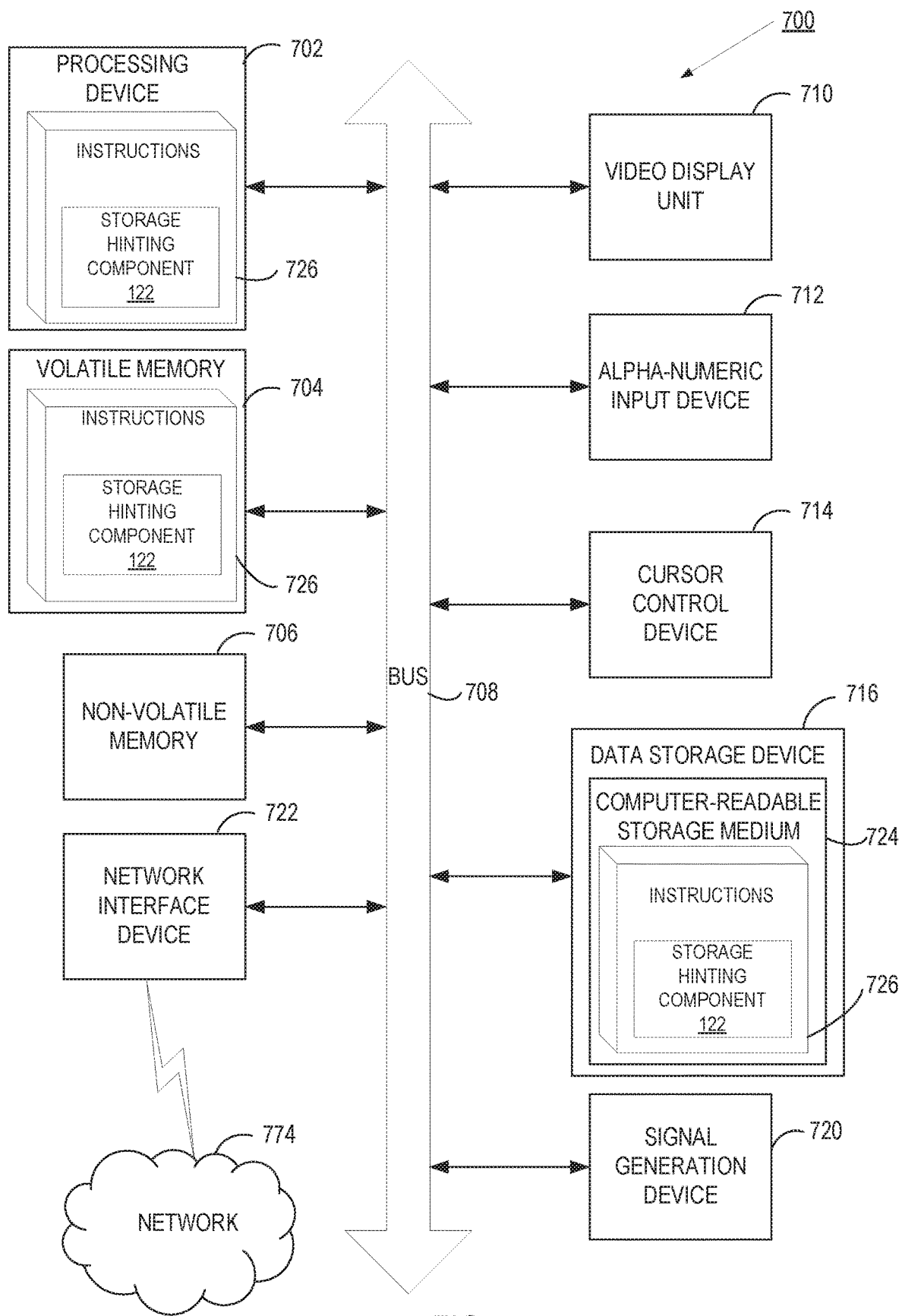
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding batched page hinting component 134 and modules illustrated in FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    detecting, by a hypervisor, that storage has been released by a guest operating system and remains allocated to a virtual machine executing the guest operating system;
    accessing, by the hypervisor, one or more sets of storage blocks, wherein a set of the one or more sets comprises an identifier that is associated with the storage and is associated with the virtual machine;
    receiving, by a processing device executing the hypervisor, a request to allocate a storage block to the virtual machine;
    identifying, by the hypervisor, at least one storage block of the one or more sets that is associated with the virtual machine; and
    allocating the at least one storage block to the virtual machine.

2. The method of claim 1, wherein the set of storage blocks comprises a plurality of storage block identifiers and each of the plurality of storage block identifiers is linked by computing entity identification data to a respective virtual machine of a plurality of virtual machines.

3. The method of claim 1, further comprising:
    receiving, by the hypervisor, a request to allocate a storage block to a second virtual machine;
    analyzing the one or more sets of storage blocks to identify a storage block associated with the second virtual machine;
    in response to the set being free of a storage block associated with the second virtual machine, clearing a storage block released by a first virtual machine and allocating the cleared storage block to the second virtual machine; and
    in response to the set including a storage block associated with the second virtual machine, allocating the storage block associated with the second virtual machine to the second virtual machine without clearing the storage block.

4. The method of claim 1, wherein the storage released by the guest operating system comprises a plurality of memory pages that are relinquished by a balloon driver of the guest operating system and are assigned by the hypervisor to another virtual machine.

5. The method of claim 1, wherein the storage comprises memory pages and the method further comprises, reusing, by the hypervisor, a memory page identified by the set without copying content of the memory page to persistent storage.

6. The method of claim 5, wherein the persistent storage comprises a swap space, and wherein the memory page released by the guest operating system is reallocated by the hypervisor to another virtual machine without copying the content of the memory page to the swap space.

7. The method of claim 1, wherein detecting that the storage has been released by the guest operating system comprises the hypervisor detecting that a shared data structure in memory was updated to add an identifier associated with the storage, wherein the shared data structure is modifiable by the virtual machine and accessible to the hypervisor.

8. The method of claim 1, wherein the set of storage blocks is represented by a bitmap that is accessible to the virtual machine and the hypervisor, and wherein the bitmap represents a set of storage blocks allocated to the virtual machine and indicates a subset of storage blocks that are unused by the guest operating system.

9. The method of claim 1, further comprising:
verifying, by the hypervisor, that the storage released by the guest operating system is exclusively assigned to the virtual machine executing the guest operating system; and
responsive to the verifying, adding the identifier associated with the verified storage to the set of storage blocks.

10. The method of claim 9, wherein verifying the storage is exclusively assigned to the virtual machine comprises determining the storage is accessible by the virtual machine and is inaccessible by other virtual machines managed by the hypervisor.

11. A system comprising:
a memory;
a processing device executing a hypervisor and operatively coupled to the memory, the processing device to:
detect that storage has been released by a guest operating system and remains allocated to a virtual machine executing the guest operating system;
access one or more sets of storage blocks, wherein a set of the one or more sets comprises an identifier that is associated with the storage and is associated with the virtual machine;
receive a request to allocate a storage block to the virtual machine;
identify, by the hypervisor, at least one storage block of the one or more sets that is associated with the virtual machine; and
allocate the at least one storage block to the virtual machine.

12. The system of claim 11, wherein the set of storage blocks comprises a plurality of storage block identifiers and each of the plurality of storage block identifiers is linked by computing entity identification data to a respective virtual machine of a plurality of virtual machines.

13. The system of claim 11, wherein the storage released by the guest operating system comprises a plurality of memory pages that are released by a balloon driver of the guest operating system and remain assigned to the virtual machine prior to being reused by the hypervisor.

14. The system of claim 11, wherein the set of storage blocks is represented by a shared data structure and the shared data structure is updated by the virtual machine to add an identifier corresponding to the storage.

15. A non-transitory machine-readable storage medium storing instructions that cause a processing device executing a hypervisor to:
detect that storage is released by a guest operating system and remains allocated to a virtual machine executing the guest operating system;
verify that the storage released by the guest operating system is exclusively assigned to the virtual machine;
accessing one or more sets of storage blocks, wherein a set of the one or more sets comprises an identifier that is associated with the storage and is associated with the virtual machine;
receive a request to allocate a storage block to the virtual machine;
identify, by the hypervisor, at least one storage block of the one or more sets that is associated with the virtual machine; and
allocating the at least one storage block to the virtual machine.

16. The non-transitory machine-readable storage medium of claim 15, wherein the set of storage blocks comprises a plurality of storage block identifiers and each of the plurality of storage block identifiers is linked by computing entity identification data to a respective virtual machine of a plurality of virtual machines.

17. The non-transitory machine-readable storage medium of claim 15, wherein the storage released by the guest operating system comprises a plurality of memory pages that are relinquished by a balloon driver of the guest operating system and are assigned by the hypervisor to another virtual machine.

18. The non-transitory machine-readable storage medium of claim 17 wherein the processing device executing the hypervisor is further to reuse a memory page identified by the set without copying content of the memory page to persistent storage.

19. The non-transitory machine-readable storage medium of claim 15, wherein the set of storage blocks is represented by a shared data structure and the shared data structure is updated by the virtual machine and is accessible to the hypervisor.

20. The non-transitory machine-readable storage medium of claim 15, wherein the set of storage blocks comprises a bitmap that represents a set of storage blocks allocated to the virtual machine and indicates a subset of storage blocks that are unused by the guest operating system.

* * * * *